United States Patent
Saito et al.

(10) Patent No.: US 11,040,713 B2
(45) Date of Patent: Jun. 22, 2021

(54) COLLISION MITIGATION APPARATUS

(71) Applicant: Honda Motor Co., Ltd., Tokyo (JP)

(72) Inventors: Kota Saito, Wako (JP); Chao Niu, Wako (JP); Shogo Takano, Wako (JP); Takashi Adachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 16/409,224

(22) Filed: May 10, 2019

(65) Prior Publication Data

US 2019/0359204 A1 Nov. 28, 2019

(30) Foreign Application Priority Data

May 25, 2018 (JP) .............................. JP2018-100190

(51) Int. Cl.
*B60W 30/085* (2012.01)
*B60W 30/16* (2020.01)
*B60W 30/095* (2012.01)

(52) U.S. Cl.
CPC ...... *B60W 30/085* (2013.01); *B60W 30/0956* (2013.01); *B60W 30/162* (2013.01); *B60W 2554/803* (2020.02)

(58) Field of Classification Search
CPC .......... B60W 30/085; B60W 30/0956; B60W 30/162; B60W 2554/803; B60W 2554/804
USPC ........................................................ 701/301
See application file for complete search history.

(56) References Cited

U.S. PATENT DOCUMENTS

| | | | | |
|---|---|---|---|---|
| 2007/0012493 A1* | 1/2007 | Jones | ...................... | B60L 50/15 180/65.22 |
| 2011/0218713 A1* | 9/2011 | Hashimoto | .......... | B60N 2/0276 701/49 |
| 2017/0137023 A1* | 5/2017 | Anderson | ............. | B60W 50/14 |
| 2018/0162444 A1* | 6/2018 | Park | ...................... | B60W 10/22 |
| 2018/0237001 A1* | 8/2018 | Lian | ....................... | B60L 50/60 |
| 2019/0176815 A1* | 6/2019 | Na | ......................... | B60W 10/20 |
| 2019/0308611 A1* | 10/2019 | Lee | ..................... | B60W 40/114 |
| 2019/0329791 A1* | 10/2019 | Oba | ....................... | B60W 50/14 |

FOREIGN PATENT DOCUMENTS

JP 2008056148 A 3/2008

* cited by examiner

*Primary Examiner* — Thomas G Black
*Assistant Examiner* — Matthias S Weisfeld
(74) *Attorney, Agent, or Firm* — Duft & Bornsen, PC (57) ABSTRACT

A collision mitigation apparatus configured to mitigate a shock to an occupant of a vehicle when a rearward vehicle collides into the vehicle from behind, including a driving unit generating a driving force, and an electronic control unit having a microprocessor and a memory. The microprocessor is configured to perform predicting whether the rearward vehicle collides into the vehicle, and controlling the driving unit so that when it is predicted that the rearward vehicle collides into the vehicle, a difference between a vehicle speed of the vehicle and a vehicle speed of the rearward vehicle reduces and a driving force of a rear wheel is greater than a driving force of a front wheel immediately before the rearward vehicle collides into the vehicle.

18 Claims, 4 Drawing Sheets

COLLISION MITIGATION APPARATUS

CROSS-REFERENCE TO RELATED APPLICATION

This application is based upon and claims the benefit of priority from Japanese Patent Application No. 2018-100190 filed on May 25, 2018, the content of which is incorporated herein by reference.

BACKGROUND OF THE INVENTION

Field of the Invention

This invention relates to a collision mitigation apparatus mitigating shock to an occupant of a vehicle when a rearward vehicle collides.

Description of the Related Art

Conventionally, an apparatus for mitigating shock to an occupant of a vehicle (a passenger) at time of collision is known that responds to determination that a vehicle behind (rearward vehicle) is about to crash into the vehicle (subject vehicle) by accelerating the subject vehicle away from the rearward vehicle so as to reduce relative speed between the subject vehicle and the rearward vehicle before collision. Such an apparatus is described in Japanese Unexamined Patent Publication No. 2008-56148 (JP2008-056148A), for example.

However, an apparatus like the one in JP2008-056148A that merely accelerates the subject vehicle before collision cannot readily ensure adequate protection of the occupant of the vehicle when the rearward vehicle collides.

SUMMARY OF THE INVENTION

An aspect of the present invention is a collision mitigation apparatus configured to mitigate a shock to an occupant of a vehicle when a rearward vehicle collides into the vehicle from behind. The apparatus includes a driving unit configured to generate a driving force in a manner of being able to vary a distribution of the driving force to a front wheel and a rear wheel, and an electronic control unit having a microprocessor and a memory. The microprocessor is configured to perform predicting whether the rearward vehicle collides into the vehicle, and controlling the driving unit so that when it is predicted that the rearward vehicle collides into the vehicle, a difference between a vehicle speed of the vehicle and a vehicle speed of the rearward vehicle reduces and a driving force of the rear wheel is greater than a driving force of the front wheel immediately before the rearward vehicle collides into the vehicle.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
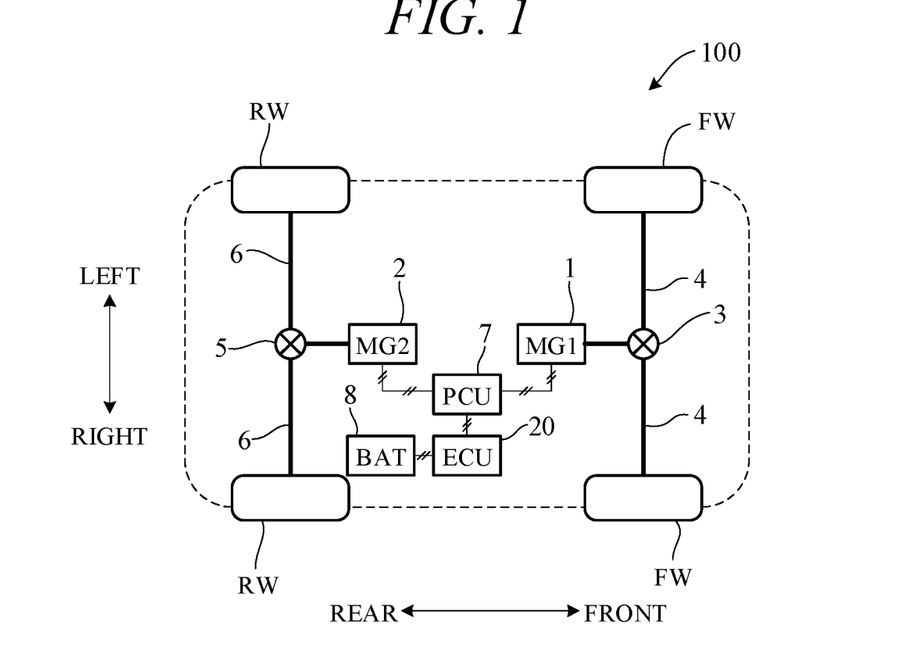
FIG. 1 is a diagram showing a configuration overview of a driving system of a self-driving vehicle incorporating a collision mitigation apparatus according to an embodiment of the invention.

Hereinafter, an embodiment of the present invention is explained with reference to FIGS. 1 to 6. FIG. 1 is a diagram showing a configuration overview of a driving system of a vehicle 100 incorporating a collision mitigation apparatus according to an embodiment of the present invention. The vehicle (also called "subject vehicle") 100 is configured as a self-driving vehicle with a self-driving capability. The vehicle 100 is not limited to driving in a self-drive mode requiring no driver driving operations but is also capable of driving in a manual drive mode by driver operations.

As shown in FIG. 1, the vehicle 100 includes a first motor-generator (MG1) and a second motor-generator (MG2) as driving power sources, and is configured as an electric vehicle. Optionally, the vehicle 100 can be configured as an internal combustion vehicle or hybrid vehicle by providing an engine (internal combustion engine) as a drive power source in place of or in addition to the motor-generators MG1 and MG2.

The power (torque) output from the first motor-generator 1 is transmitted to left and right front wheels FW through a differential unit 3 and drive shafts 4. The power (torque) output from the second motor-generator 2 is transmitted to left and right rear wheels FW through a differential unit 5 and drive shafts 6. Therefore, the vehicle 100 is configured as a four-wheel drive vehicle in which front wheels FW and rear wheels RW are driving wheels. Optionally, in-wheel motors installed inside front wheels FW and rear wheels RW can be used instead of a pair of motor-generators MG1 and MG2.

The first and second motor-generators 1 and 2 each has a rotor and a stator and can function as a motor and as a generator. Namely, the rotors of the first and second motor-generators 1 and 2 are driven by electric power supplied from a battery (BAT) 8 through a power control unit (PCU) 7 to coils of the stators. In such case, the first and second motor-generators 1 and 2 function as motors.

On the other hand, when rotating shafts of rotors of the first and second motor-generators 1 and 2 are driven by external forces, the first and second motor-generators 1 and 2 generate electric power that is applied through the power control unit 7 to charge the battery 8. In such case, the first and second motor-generators 1 and 2 function as generators. The power control unit 7 incorporates an inverter controlled by instructions from the controller 4 configured as an electric control unit (ECU) so as to individually control output torque or regenerative torque of the first motor-generator 1 and the second motor-generator 2.

Figure 2:
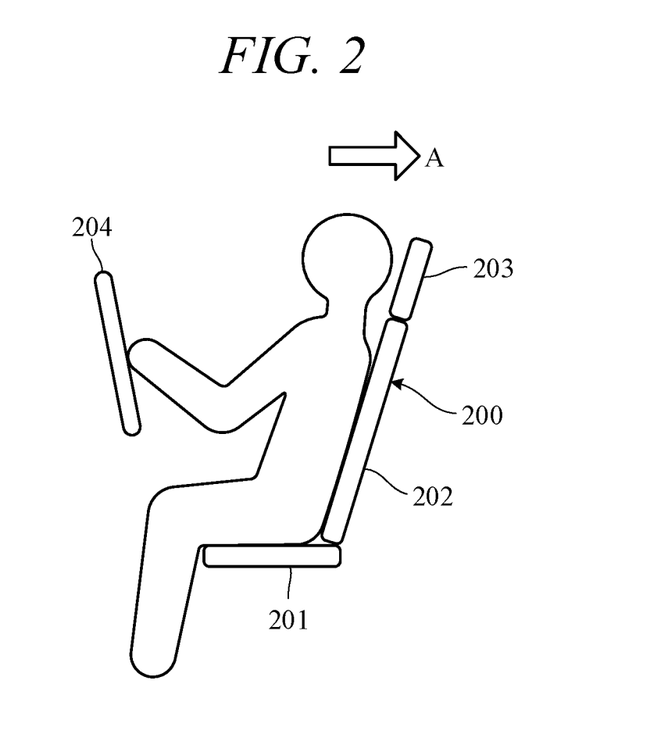
FIG. 2 is a diagram schematically showing a configuration of a seat mounted on the vehicle of FIG. 1.

FIG. 2 is a diagram schematically showing an example of a configuration of a seat 200 mounted on the vehicle 100. As shown in FIG. 2, the seat 200 includes a seat cushion 201 on which an occupant (for example, a driver) sits, a seat back 202 for supporting upper body of the occupant and a head rest 203 for supporting head of the occupant. As shown in FIG. 2, the occupant often sits on the seat 200 in a state where head is located forward away from the head rest 203. In FIG. 2, a steering wheel 204 is provided in front of the occupant.

Figure 3:
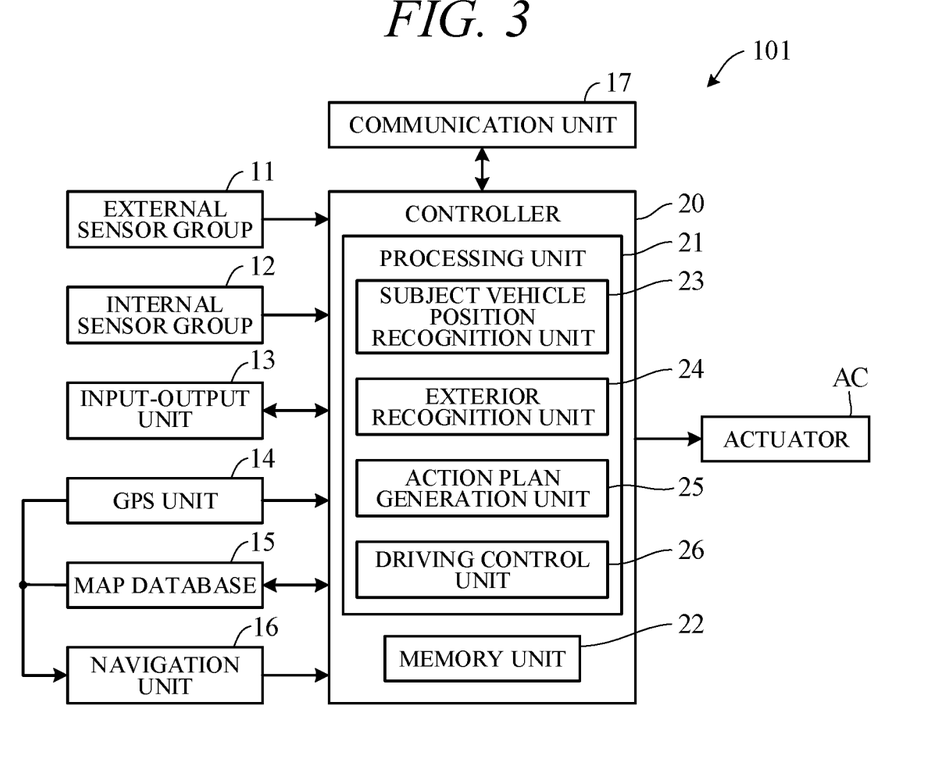
FIG. 3 is a block diagram schematically illustrating overall configuration of a vehicle control system controlling the self-driving vehicle of FIG. 1.

FIG. 3 is a block diagram schematically illustrating overall configuration of a vehicle control system 101 mounted on the vehicle 100 according to the present embodiment, and shows a configuration in relation to self-driving. As shown in FIG. 3, the vehicle control system 101 includes mainly the controller 20, and as members communicably connected with the controller 20 through CAN (Controller Area Network) communication or the like, an external sensor group 11, an internal sensor group 12, an input-output unit 13, a GPS unit 14, a map database 15, a navigation unit 16, a communication unit 17, and actuators AC for traveling.

The term external sensor group 11 herein is a collective designation encompassing multiple sensors (external sensors) for detecting external circumstances constituting vehicle ambience data. For example, the external sensor group 11 includes, inter alia, a LIDAR (Light Detection and Ranging) for measuring distance from the vehicle 100 to ambient obstacles by measuring scattered light produced by laser light radiated from the vehicle 100 in every direction, a RADAR (Radio Detection and Ranging) for detecting other vehicles and obstacles around the vehicle 100 by radiating electromagnetic waves and detecting reflected waves, and cameras having a CCD, CMOS or other image sensor and attached to the vehicle 100 for imaging ambience (forward, reward and sideways) of the vehicle 100.

The term internal sensor group 12 herein is a collective designation encompassing multiple sensors (internal sensors) for detecting driving state of the vehicle 100. For example, the internal sensor group 12 includes, inter alia, a vehicle speed sensor for detecting vehicle speed of the vehicle 100 and acceleration sensors for detecting forward-rearward direction acceleration and lateral acceleration of the vehicle 100, respectively, rotational speed sensors for detecting rotational speed of the first and second motor-generators 1 and 2, and a yaw rate sensor for detecting rotation angle speed around a vertical axis through center of gravity of the vehicle 100. The internal sensor group 12 also includes sensors for detecting driver driving operations in manual drive mode, including, for example, accelerator pedal operations, brake pedal operations, steering wheel operations and the like.

The term input-output unit 13 is used herein as a collective designation encompassing apparatuses receiving instructions input by the driver and outputting information to the driver. The input-output unit 13 includes, inter alia, switches which the driver uses to input various instructions, a microphone which the driver uses to input voice instructions, a display for presenting information to the driver via displayed images, and a speaker for presenting information to the driver by voice. The switch of the input-output unit 13 includes a self/manual drive select switch for instructing a self-drive mode or manual drive mode and a driving level instruction switch for instructing a driving automation level.

The self/manual drive select switch, for example, is configured as a switch manually operable by the driver to output an instruction of switching to a self-drive mode enabling self-drive functions or a manual drive mode disabling self-drive functions in accordance with operation of the switch. Optionally, the self/manual drive select switch can be configured to instruct switching from manual drive mode to self-drive mode or from self-drive mode to manual drive mode without operating the self/manual drive select switch. For example, when a predetermined operation is made by a driver or a predetermined condition is satisfied, drive mode can be switched automatically to self-drive mode or manual drive mode.

The driving level instruction switch (FIG. 4), for example, is configured as a switch manually operable by the driver to instruct driving automation level in accordance with operation of the switch. Driving automation level is an index of driving automation degree. SAE J3016 recommended by SAE (Society of Automotive Engineers) International, for example, classifies driving automation into Level 0 to Level 5. Level 0 indicates no driving automation. At level 0, all driving operations are performed by a human operator (driver).

At Level 1, the vehicle control system performs one among acceleration, steering and braking of the Dynamic Driving Task (DDT) (in driver assistance automation). At Level 1, therefore, the vehicle control system 101 operates under specified conditions to control some among the accelerator, brakes and steering wheel in accordance with surrounding circumstances, and the driver performs all of the remaining DDT.

At Level 2, the vehicle control system simultaneously performs multiple DDT subtasks among acceleration, steering and braking (in partial driving automation). Up to Level 2, the driver is responsible for monitoring vehicle surroundings.

At Level 3, the vehicle control system 101 performs all of the DDT acceleration, steering and braking subtasks, and the driver responds only when requested by the vehicle control system 101. At Level 3 and higher, the vehicle control system 101 monitors the surroundings and no responsibility to monitor surroundings falls on a human.

At Level 4, the vehicle control system 101 performs the entire DDT under specified conditions and a user (driver) does not take over even when the vehicle control system 101 cannot continue driving (high driving automation). At Level 4 and higher, therefore, the vehicle control system 101 deals even with emergency situations.

At Level 5, the vehicle control system 101 autonomously self-drives under all conditions (full driving automation).

The driving level instruction switch is, for example, configured as a switch manually operable by the driver to select one of Levels 0 to 5 as driving automation level. Optionally, the vehicle control system 101 can be adapted to determine whether factors like surrounding circumstances meet conditions enabling self-driving and automatically operate the driving level instruction switch to instruct selection of one of the Levels 0 to 5 in accordance with the determination results. For example, when a predetermined condition is satisfied, the vehicle control system 101 can switch driving automation level from Level 2 to Level 3.

The GPS unit 14 includes a GPS receiver for receiving position determination signals from multiple GPS satellites, and measures absolute position (latitude, longitude and the like) of the vehicle 100 based on the signals received from the GPS receiver.

The map database 15 is a unit storing general map data used by the navigation unit 16 and is, for example, implemented using a hard disk. The map data include road position data and road shape (curvature etc.) data, along with intersection and road branch position data. The map data stored in the map database 15 are different from high-accuracy map data stored in a memory unit 22 of the controller 20.

The navigation unit 16 retrieves target road routes to destinations input by the driver and performs guidance along selected target routes. Destination input and target route guidance is performed through the input-output unit 13. Destination can be automatically set not through the input-output unit 13. Target routes are computed based on current position of the vehicle 100 measured by the GPS unit 14 and map data stored in the map database 15.

The communication unit 17 communicates through networks including the Internet and other wireless communication networks to access servers (not shown in the drawings) to acquire map data, traffic data and the like, periodically or at arbitrary times. Acquired map data are output to the map database 15 and/or memory unit 22 to update their stored map data. Acquired traffic data include congestion data and traffic light data including, for instance, time to change from red light to green light.

The actuators AC are actuators for operating various devices in relation to vehicle traveling, i.e., for traveling of the vehicle 100. The actuators AC include the first and second motor-generators 1 and 2, a brake actuator for operating a braking device, and a steering actuator for steering the front wheels FW. Although not shown in FIG. 3, a power control unit 7, etc. are provided between the controller 20 and the actuators AC (for example, first and second motor-generators 1 and 2).

The controller 20 incorporates a computer including a CPU or other processing unit (a microprocessor) 21 for performing processing in relation to a travel control, the memory unit (a memory) 22 of RAM, ROM, hard disk and the like, and other peripheral circuits such as I/O interface not shown in the drawings.

The memory unit 22 stores high-accuracy detailed map data including, inter alia, lane center position data and lane boundary line data. More specifically, road data, traffic regulation data, address data, facility data, and telephone number data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 22 also stores various programs for performing processing, and threshold values used in the programs, etc.

As functional configurations in relation to self-driving, the processing unit 21 includes mainly a subject vehicle position recognition unit 23, an exterior recognition unit 24, an action plan generation unit 25, and a driving control unit 26.

The subject vehicle position recognition unit 23 recognizes map position of the vehicle (subject vehicle) 100 (subject vehicle position), based on position data of the vehicle 100 calculated by the GPS unit 14 and map data stored in the map database 15. Optionally, the subject vehicle position can be recognized using map data (building shape data and the like) stored in the memory unit 22 and ambience data of the vehicle 100 detected by the external sensor group 11, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 17.

The exterior recognition unit 24 recognizes external circumstances around the vehicle 100 based on signals from LIDARs, RADARs, cameras and the like of the external sensor group 11. For example, it recognizes position, speed and acceleration of nearby vehicles (forward vehicle or rearward vehicle) driving in the vicinity of the vehicle 100, position of vehicles stopped or parked in the vicinity of the vehicle 100, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 25 generates a driving path of the vehicle 100 (target path) from present time point to a certain time ahead based on, for example, a target route computed by the navigation unit 16, subject vehicle position recognized by the subject vehicle position recognition unit 23, and external circumstances recognized by the exterior recognition unit 24. When multiple paths are available on the target route as target path candidates, the action plan generation unit 25 selects from among them the path that optimally satisfies legal compliance, safe efficient driving and other criteria, and defines the selected path as the target path. The action plan generation unit 25 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include subject vehicle position data and vehicle state data for every unit time Δt. The position data are, for example, target point data indicating 2D coordinate position on road, and the vehicle state data are vehicle speed data indicating vehicle speed, direction data indicating direction of the vehicle 100, and the like. Action plan is updated every unit time Δt.

The action plan generation unit 25 generates the target path by connecting position data at every unit time Δt between present time point and predetermined time period T1 ahead in time order. Further, the action plan generation unit 25 calculates acceleration (target acceleration) of sequential unit times Δt, based on vehicle speed (target vehicle speed) corresponding to target point data of sequential unit times Δt on target path. In other words, the action plan generation unit 25 calculates target vehicle speed and target acceleration. Optionally, the driving control unit 26 can calculate target acceleration.

The driving control unit 26 controls the actuators AC in accordance with drive mode (self-drive mode, manual drive mode). For example, in self-drive mode, the driving control unit 26 controls the actuators AC to drive the vehicle 100 along target path generated by the action plan generation unit 25. Namely, the driving control unit 26 controls the first and second motor-generators 1 and 2, brake actuator and steering actuator so that the vehicle 100 travels through the target points of the unit times Δt.

More specifically, in self-drive mode, the driving control unit 26 calculates required driving force for achieving the target accelerations at each unit time included in the action plan generated by the action plan generation unit 25, taking running resistance caused by road gradient and the like into account. And the actuators AC are feedback controlled to bring actual acceleration detected by the internal sensor group 12, for example, into coincidence with target acceleration. In other words, it controls the actuators AC so that the vehicle 100 travels at target vehicle speed and target acceleration. On the other hand, in manual drive mode, the driving control unit 26 controls the actuators AC in accordance with driving instructions by the driver (accelerator opening angle and the like) acquired from the internal sensor group 12.

A point to be considered in this regard is that when, for example, the vehicle is traveling in level 3 or higher self-drive mode, the driver is not under forward surveillance obligation and is apt to be relaxing without keeping a careful eye on surrounding conditions. When under such circumstances another vehicle (rearward vehicle) approaches and collides into the vehicle 100 from behind (rear end collision), shock of the collision catches the occupants (in particular, the driver) by surprise. Since the occupants are therefore not braced for the collision, they are more susceptible to serious injury. For example when, as shown in FIG. 2, the head of the occupant is not in close contact with the head rest 203 at time of a rear end collision, movement of the occupant's head relative to his or her torso (arrow A) is large and the resulting recoil of the head and strain on the neck is liable to cause whiplash. Therefore, in order to minimize occupant injury at time of rear-ending by a rearward vehicle (rear-end collision), the collision mitigation apparatus according to the present embodiment is configured as set out in the following.

Figure 4:
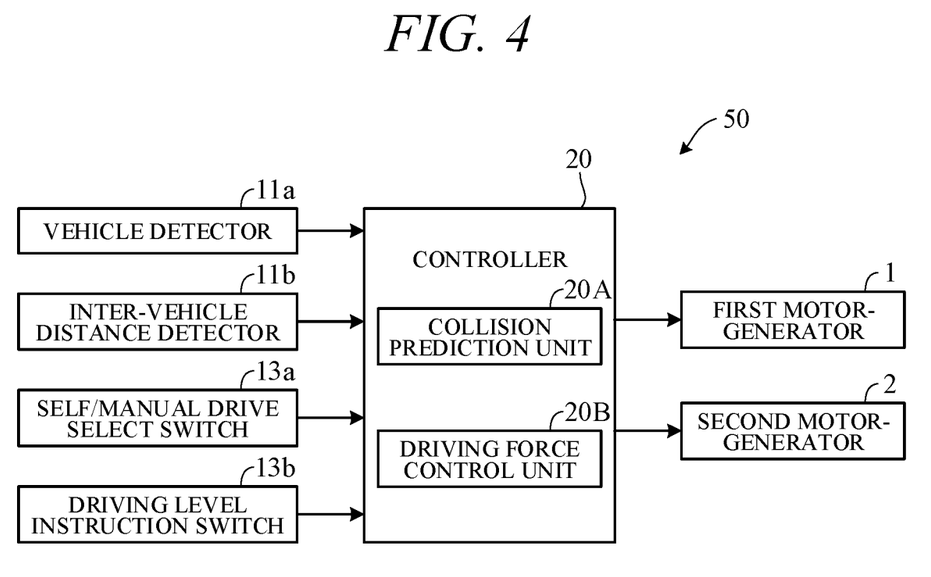
FIG. 4 is a block diagram illustrating main configuration of the collision mitigation apparatus according to the embodiment of the invention.

FIG. 4 is a block diagram showing main components a collision mitigation apparatus 50 according to an embodiment of the present invention. The collision mitigation apparatus 50 is adapted to control driving actions of the vehicle 100 in self-drive mode and configures members of the vehicle control system 101 of FIG. 3.

As shown in FIG. 4, the collision mitigation apparatus 50 includes the controller 20, a vehicle detector 11a, an inter-vehicle distance detector 11b, a self/manual drive select switch 13a, a driving level instruction switch 13b, the first motor-generator 1, and the second motor-generator 2.

The vehicle detector 11a is a member of the external sensor group 11 of FIG. 3 and includes, inter alia, one or more LIDARs, RADARs and cameras for detecting other vehicles around the subject vehicle. The inter-vehicle distance detector 11b is a member of the external sensor group 11 and is formed as a lidar or radar for detecting inter-vehicle distance between the subject vehicle and another vehicle. The self/manual drive select switch 13a and driving level instruction switch 13b are members of the input-output unit 13 of FIG. 2. Signals are input to the controller 20 from the vehicle detector 11a, inter-vehicle distance detector 11b, self/manual drive select switch 13a and driving level instruction switch 13b. The controller 20 outputs control signals through the electric power control unit 7 (FIG. 1) to the first motor-generator 1 and the second motor-generator 2.

As functional constituents, the controller 20 includes a collision prediction unit 20A and a driving force control unit 20B. The collision prediction unit 20A is, for example, implemented by the exterior recognition unit 24 of FIG. 3. The driving force control unit 20B is, for example, implemented by the driving control unit of 26 of FIG. 3.

The collision prediction unit 20A uses signals from the vehicle detector 11a and the inter-vehicle distance detector 11b to predict whether a vehicle (rearward vehicle) following immediately behind the vehicle 100 is destined to approach and collide into the vehicle 100. More specifically, the collision prediction unit 20A detects the rearward vehicle using a signal from the vehicle detector 11a and detects inter-vehicle distance L between the vehicle 100 and the rearward vehicle using a signal from the inter-vehicle distance detector 11b. The collision prediction unit 20A further calculates relative vehicle speed V of the rearward vehicle with respect to the vehicle 100 by time-differentiating inter-vehicle distance L. Relative vehicle speed V corresponds to a value obtained by subtracting vehicle speed of the rearward vehicle from vehicle speed of the vehicle 100. It is therefore a positive value when inter-vehicle distance L increases and a negative value when inter-vehicle distance L decreases. The collision prediction unit 20A predicts collision of the rearward vehicle into the vehicle 100 when detected inter-vehicle distance L is less than first predetermined distance La and calculated relative vehicle speed V is less than first predetermined vehicle speed Va. First predetermined vehicle speed Va is typically set to negative value.

When the collision prediction unit 20A predicts collision of the rearward vehicle owing to inter-vehicle distance L being less than first predetermined distance La and relative vehicle speed V being less than first predetermined vehicle speed Va, the driving force control unit 20B calculates driving force of the vehicle 100 capable of converging relative vehicle speed V of the rearward vehicle with respect to the vehicle 100 on 0. It then outputs control signals to the first motor-generator 1 and the second motor-generator 2 for accelerating the vehicle 100 by the calculated driving force.

After the driving force control unit 20B outputs control signals to the first motor-generator 1 and the second motor-generator 2 for converging relative vehicle speed V on 0, the collision prediction unit 20A again uses a signal from the inter-vehicle distance detector 11b to predict whether the rearward vehicle is destined to collide into the vehicle 100. Specifically, the collision prediction unit 20A uses a signal from the inter-vehicle distance detector 11b to detect inter-vehicle distance L between the vehicle 100 and the rearward vehicle and to calculate relative vehicle speed V of the rearward vehicle with respect to the vehicle 100, and predicts that the rearward vehicle is destined to collide into the vehicle 100 when detected inter-vehicle distance L is less than second predetermined distance Lb and calculated relative vehicle speed V is less than second predetermined vehicle speed Vb. Second predetermined distance Lb (second predetermined inter-vehicle distance) is set to a smaller value than first predetermined distance La (first predetermined inter-vehicle distance), and second predetermined vehicle speed Vb is set to 0, for example.

When the collision prediction unit 20A predicts impending collision of the vehicle behind owing to inter-vehicle distance L being less than second predetermined distance Lb and relative vehicle speed V being less than second predetermined vehicle speed Vb, the driving force control unit 20B calculates expected collision time. Then, at predetermined time period preceding expected collision time, namely, immediately preceding collision time (e.g., by one second), the driving force control unit 20B outputs control signals to the first motor-generator 1 and the second motor-generator 2 instructing the first motor-generator 1 to generate regenerative torque and the second motor-generator 2 to generate driving torque. At this time, distribution of driving force to front wheel (FW) side and rear wheel (RW) side is controlled so as to maintain collision imminent accelerating force constant from total vehicle perspective. Since this puts the vehicle 100 into forward tilting state, heads of vehicle occupants can be brought into close contact with the head rests 203 immediately before collision.

Figure 5:
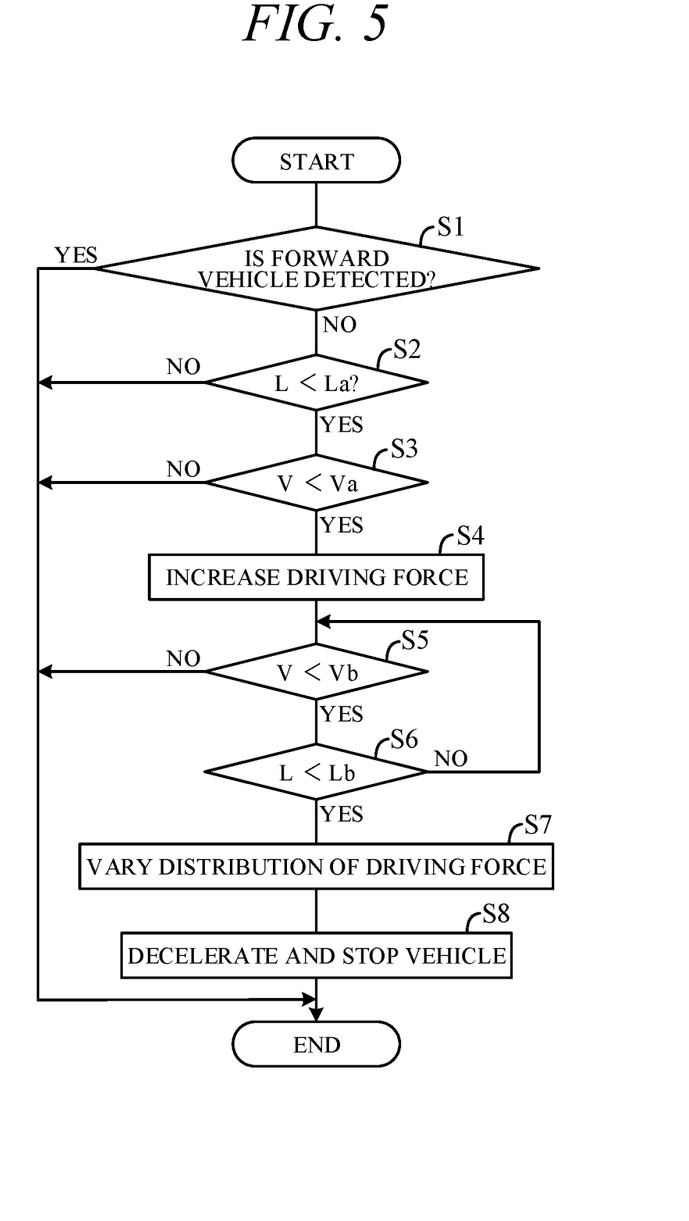
FIG. 5 is a flowchart showing an example of processing performed by a controller of FIG. 4.

FIG. 5 is a flowchart showing an example of processing performed by the CPU of the controller 20 of FIG. 4 in accordance with a program stored in the memory unit 22 in advance. The processing of this flowchart is started during vehicle traveling in response to, for example, an instruction from the self/manual drive select switch 13a to implement self-drive mode and an instruction from the driving level instruction switch 13b to implement level 3 or higher self-driving and is periodically executed at predetermined time intervals so long as this state is maintained. During vehicle running, distribution of driving force to the front wheels FW and rear wheels RW is initially 50:50, for example. Optionally, greater driving force can be distributed to the front wheels FW than to the rear wheels RW.

First, in S1 (S: processing Step), signals from the vehicle detector 11a and inter-vehicle distance detector 11b are used to determine whether a vehicle is detected to be traveling within predetermined distance ahead of the vehicle 100. Although when a forward vehicle is detected by the vehicle detector 11a, the inter-vehicle distance detector 11b detects inter-vehicle distance between the forward vehicle and the vehicle 100, the determination in S1 is as to whether the detected inter-vehicle distance is within a predetermined distance. If a negative decision is made in S1, the routine proceeds to S2, and if a positive decision is made, the processing is terminated.

In S2, signals from the vehicle detector 11a and inter-vehicle distance detector 11b are used to determine whether a rearward vehicle is detected to be traveling within shorter than first predetermined distance La from the vehicle 100. Although when a rearward vehicle is detected by the vehicle detector 11a, the inter-vehicle distance detector 11b detects inter-vehicle distance L between the rearward vehicle and the vehicle 100, the determination in S2 is as to whether the detected inter-vehicle distance L is shorter than first predetermined distance La. If a positive decision is made in S2, the routine proceeds to S3, and if a negative decision is made, the processing is terminated.

In S3, relative vehicle speed V of the rearward vehicle with respect to the vehicle 100 is calculated based on a signal from the inter-vehicle distance detector 11b, and whether detected relative vehicle speed V is smaller than first predetermined vehicle speed Va (negative value) is determined. This amounts to determining whether rate of approach of the rearward vehicle is equal to or greater than predetermined value. If a positive decision is made in S3, the routine proceeds to S4, and if a negative decision is made, the processing is terminated. In S4, control signals are output to the first motor-generator 1 and the second motor-generator 2 in order to increase driving force of the vehicle 100 and thereby converge relative vehicle speed V of the rearward vehicle with respect to the vehicle 100 on 0, i.e., so as to increase relative vehicle speed V (decrease relative vehicle speed V magnitude in terms of absolute value).

Next, in S5, relative vehicle speed V of the rearward vehicle with respect to the vehicle 100 is calculated based on a signal from the inter-vehicle distance detector 11b, and whether calculated relative vehicle speed V is smaller than second predetermined speed Vb (e.g., 0) is determined. This amounts to determining whether the rearward vehicle is approaching. If a positive decision is made in S5, the routine proceeds to S6, and if a negative decision is made, the processing is terminated. In S6, whether inter-vehicle distance L between the vehicle 100 and the rearward vehicle detected by the inter-vehicle distance detector 11b is smaller than second predetermined distance Lb is determined. Expected collision time is simultaneously calculated. If a positive decision is made in S6, i.e., if rear-ending by the rearward vehicle is determined to be unavoidable, the routine proceeds to S7, and if a negative decision is made, returns to S5.

In S7, control signals are output to the first motor-generator 1 and the second motor-generator 2 immediately before expected collision time to instruct the first motor-generator 1 to generate regenerative torque and the second motor-generator 2 to generate driving torque, while maintaining constant total vehicle acceleration. After the rearward vehicle rear-ends the vehicle 100, the routine proceeds to S8, in which control signals are output to the first motor-generator 1, the second motor-generator 2 and the brake actuator to decelerate the vehicle 100 to stopped state at predetermined rate of deceleration. Main electric power supply of the vehicle 100 is then turned OFF. Among the aforesaid processing steps, those of S4 onward can be considered processing related to a collision mitigation control.

Figure 6:
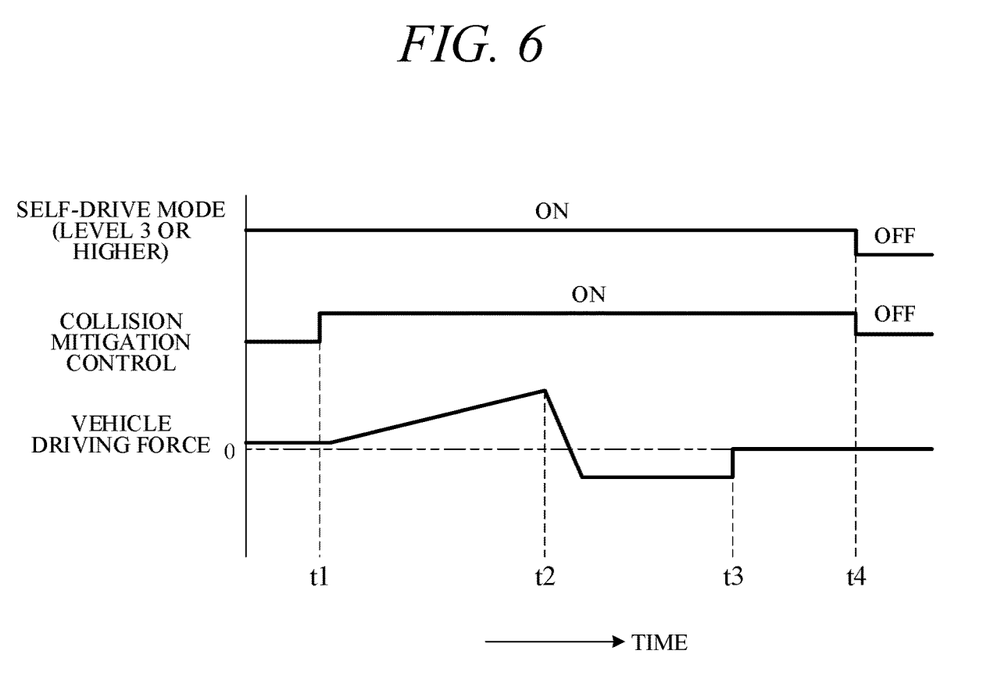
FIG. 6 is a time chart showing an example of actions performed by the collision mitigation apparatus according to the embodiment of the invention.

FIG. 6 is a time chart showing an example of actions performed by the collision mitigation apparatus 50 according to the present embodiment. The example of FIG. 6 shows time-course changes in implementation or non-implementation (ON or OFF) of level 3 or higher self-drive mode, implementation or non-implementation (ON or OFF) of collision mitigation control, and driving force (vehicle driving force) of the vehicle 100.

Actions shown in the time chart of FIG. 6 start from state of normal traveling of the vehicle 100 at constant driving force in level 3 or higher self-drive mode and assume that a vehicle is approaching the vehicle 100 from behind at time t1. When inter-vehicle distance L between the vehicle 100 and the rearward vehicle falls to shorter than first predetermined distance La and relative vehicle speed V of the rearward vehicle with respect to the vehicle 100 falls below first predetermined vehicle speed Va, the collision mitigation control is started to increase driving force of the vehicle 100 (S4).

Then when the rearward vehicle further approaches the vehicle 100 under condition of relative vehicle speed V being below second predetermined vehicle speed Vb and inter-vehicle distance L being shorter than second predetermined distance Lb, rear-ending of the vehicle 100 by the rearward vehicle becomes impossible to avoid. Immediately before the rearward vehicle collides, the front wheels FW are made to produce regenerative torque and the rear wheels RW are supplied driving torque. The vehicle 100 therefore assumes a forward tilting (nose down) state (S7). The head rests 203 therefore shift toward and closely contact heads of the occupants. When the rearward vehicle rear-ends the vehicle 100 at time t2 in this state, persons onboard the vehicle 100 are impacted through the vehicle 100 by the shock of the collision but their head positions are restricted by the head rests 203 so that shock of the collision acting on their necks is mitigated and likelihood of their suffering whiplash is minimized.

Vehicle driving force is decreased from time t2 to vehicle driving force of 0 at time t3 and the vehicle stops (S8). Then, at time t4, the main electric power supply is turned OFF to terminate (turn OFF) self-drive mode and terminate (turn OFF) the collision mitigation control.

The present embodiment can achieve advantages and effects such as the following:

(1) The collision mitigation apparatus 50 according to the present embodiment is installed in the vehicle 100 for mitigating shock to vehicle driver and passengers (occupants) when a rearward vehicle collides into the vehicle 100 from behind. The apparatus 50 includes: the first and second motor-generators 1 and 2 adapted to generate vehicle driving force and capable of varying distribution of driving force to the front wheels FW and rear wheels RW; the collision prediction unit 20A adapted to predict whether the rearward vehicle behind the vehicle 100 collides into the vehicle 100; and the driving force control unit 20B responsive to prediction by the collision prediction unit 20A of the rearward vehicle colliding into the vehicle 100, for in advance of the predicted collision implementing a collision mitigation control including control of the first and second motor-generators 1 and 2 to reduce magnitude (absolute value) of relative vehicle speed V between the vehicle 100 and the rearward vehicle (to 0, for example), namely, to increase vehicle driving force, and control of the first and second motor-generators 1 and 2 to make driving force of the rear wheels RW greater than driving force of the front wheels FW, specifically, to make the front wheels FW produce regenerative torque and to supply driving torque to the rear wheels RW (FIGS. 1 and 4).

Since this configuration can increase rear wheel (RW) side driving force to greater than front wheel (FW) side driving force immediately before a following rearward vehicle collides, it can mitigate shock of the collision to vehicle occupants by tilting the vehicle 100 forward. More specifically, since this helps to ensure close contact of the head rests 203 with the heads of those on board, injury to the driver and other occupants can be minimized. Moreover, collision mitigation control is performed that decreases magnitude of relative vehicle speed V (rate of approach) of the rearward vehicle with respect to the vehicle 100, thereby further reducing injury to occupants owing to the rear-end collision.

(2) The vehicle 100 is a self-driving vehicle having a self-driving capability, and the collision mitigation apparatus 50 further includes the driving level instruction switch 13b for switching driving automation level to level of lower than 3, at which the driver has a responsibility to monitor surroundings during vehicle traveling, or to level of 3 or higher, at which the driver does not have the responsibility to monitor surroundings (FIG. 4). When the collision prediction unit 20A predicts that the rearward vehicle collides into the vehicle 100, the driving force control unit 20B responds, on condition of the driving level instruction switch 13b having switched driving automation level to level 3 or higher, by, shortly before the rearward vehicle rear-ends the vehicle 100, controlling the first and second motor-generators 1 and 2 to reduce magnitude (absolute value) of relative vehicle speed V between vehicle 100 and the rearward vehicle and to make driving force of the rear wheels RW greater than driving force of the front wheels FW. Probability of vehicle occupants not keeping their heads in close contact with then head rests 203 is high during self-driving at level 3 or higher. Performance of collision mitigation control on condition of self-driving level being level 3 or higher therefore enables optimum occupant protection with minimal change of vehicle 100 behavior.

(3) When the collision prediction unit 20A predicts that the rearward vehicle collides into the vehicle 100, the driving force control unit 20B controls the first and second motor-generators 1 and 2 so that the first motor-generator 1 on front wheel FW side produces regenerative torque and the second motor-generator 2 on rear wheel RW side generates driving torque. Owing to this control, driving force difference between the front wheel FW side and the rear wheel RW side enlarges, so that the vehicle 100 can be easily made to assume forward tilting state.

Various modifications of the aforesaid embodiment are possible. Some examples are explained in the following. In the aforesaid embodiment, the first and second motor-generators 1 and 2 are adapted to generate driving force so as to enable variation of driving force distribution to the front wheels FW and rear wheels RW. However, a driving unit is not limited to this configuration. For example, differently from in the aforesaid embodiment in which the first motor-generator 1 is provided as a front driving unit for driving the front wheels FW and the second motor-generator 2 as a rear driving unit for driving the rear wheels RW, motive power generated by an engine provided in place of the first and second motor-generators 1 and 2 can be transmitted through a transmission to the front wheel side differential unit 3 and also be transmitted to the rear wheel differential unit 5 through a power distribution mechanism provided on a propeller shaft, for example, to enable variation of power distribution to the front wheels and rear wheels.

In the aforesaid embodiment, the collision prediction unit 20A is adapted to use signals from the vehicle detector 11a and the inter-vehicle distance detector 11b to predict whether a rearward vehicle following the vehicle 100 is destined to approach and collide into the vehicle 100. However, a collision prediction unit is not limited to this configuration. In the aforesaid embodiment, relative vehicle speed of the rearward vehicle with respect to the vehicle 100 is calculated by time-differentiating inter-vehicle distance L detected by the inter-vehicle distance detector 11b as a distance detector. However, a relative speed calculation unit is not limited to this configuration. In the aforesaid embodiment, the driving force control unit 20B responds to prediction by the collision prediction unit 20A that the rearward vehicle is destined to collide into the vehicle 100 by controlling the first and second motor-generators 1 and 2 so that the first motor-generator 1 produces regenerative torque and the second motor-generator 2 generates driving torque. However, a drive force control unit is not limited to this configuration. Namely, the drive force control unit can be of any configuration insofar as it controls the driving unit in advance of collision between the vehicle 100 and the rearward vehicle so as to reduce magnitude (absolute value) of relative vehicle speed between the vehicle 100 and the rearward vehicle and make driving force of the rear wheels RW greater than driving force of the front wheels FW. For example, driving torque can be supplied to both the front wheels FW and the rear wheels. As another example, in order to respond to impending collision, the drive force control unit can control the driving unit so as to generate braking force in the front wheels FW and apply driving force to only the rear wheels RW. Control of the driving unit for making driving force of the rear wheels RW greater than driving force of the front wheels FW is preferably implemented immediately before the vehicle behind collides (e.g., predetermined time period before predicted collision time).

In accordance with the aforesaid embodiment, the collision mitigation control of processing steps S4 to S8 is performed in self-drive mode of level 3 or higher. However, collision mitigation control can also optionally be performed even in self-drive mode lower than level 3. Moreover, collision mitigation control can be performed not only in self-drive mode but also optionally in manual drive mode. And performance of collision mitigation control is not limited to during vehicle traveling, but can also be performed when the vehicle is stopped. In other words, collision mitigation apparatus according to the present embodiment can be utilized irrespective of whether the vehicle is traveling or stopped.

The present invention can also be used as a collision mitigation method configured to mitigate a shock to an occupant of a vehicle when a rearward vehicle collides into the vehicle from behind.

The above embodiment can be combined as desired with one or more of the above modifications. The modifications can also be combined with one another.

According to the present invention, it is possible to sufficiently protect an occupant of a vehicle when a rearward vehicle collides into the vehicle.

Above, while the present invention has been described with reference to the preferred embodiments thereof, it will be understood, by those skilled in the art, that various changes and modifications may be made thereto without departing from the scope of the appended claims.

What is claimed is:

1. A collision mitigation apparatus configured to mitigate a shock to an occupant of a vehicle when a rearward vehicle collides into the vehicle from behind,
the apparatus comprising:
a driving unit configured to generate a driving force in a manner of being able to vary a distribution of the driving force to a front wheel and a rear wheel; and
an electronic control unit having a microprocessor and a memory, wherein
the microprocessor is configured to perform
predicting whether the rearward vehicle collides into the vehicle;
controlling the driving unit so that when it is predicted that the rearward vehicle collides into the vehicle, the vehicle travels at a forward tilting state while accelerating immediately before the rearward vehicle collides into the vehicle, and
the controlling including varying the distribution of the driving force so that a driving force of the rear wheel is greater than a driving force of the front wheel while maintaining a constant acceleration of the vehicle.

2. The apparatus according to claim 1, wherein
the vehicle is a self-driving vehicle with a self-drive function,
the apparatus further comprises
a driving level switching portion configured to switch a driving automation level to a first driving automation level involving a driver responsibility to monitor surroundings during traveling or a second driving automation level not involving the driver responsibility to monitor the surroundings during traveling, and
the microprocessor is configured to perform
the controlling including controlling the driving unit so that when the driving automation level is switched to the second driving automation level by the driving level switching portion and it is predicted that the rearward vehicle collides into the vehicle, the vehicle travels at the forward tilting state while accelerating.

3. The apparatus according to claim 1, wherein
the driving unit includes a front driving unit driving the front wheel and a rear driving unit driving the rear wheel,
the front driving unit is configured by a motor-generator, and
the microprocessor is configured to perform
the controlling including controlling the driving unit so that when it is predicted that the rearward vehicle collides into the vehicle, the front driving unit generates a regenerative torque and the rear driving unit generates a driving torque while accelerating the vehicle at the constant acceleration.

4. The apparatus according to claim 3, wherein
the front driving unit is a first motor-generator, and
the rear driving unit is configured by a second motor-generator.

5. The apparatus according to claim 1, further comprising
a distance detector configured to detect an inter-vehicle distance from the vehicle to the rearward vehicle, wherein
the microprocessor is configured to further perform
calculating a relative vehicle speed by subtracting the vehicle speed of the rearward vehicle from the vehicle speed of the vehicle, and
the predicting including predicting that the rearward vehicle collides into the vehicle when the inter-vehicle distance detected by the distance detector is smaller than a predetermined inter-vehicle distance and the relative vehicle speed calculated in the calculating is smaller than a predetermined relative vehicle speed.

6. The apparatus according to claim 5, wherein
the predetermined inter-vehicle distance is a first predetermined inter-vehicle distance,
the predetermined relative vehicle speed is a negative value, and
the microprocessor is configured to perform
the controlling including controlling the driving unit so that the driving force of the vehicle increases when it is predicted that the rearward vehicle collides into the vehicle at a first time point, and so that the vehicle travels at the forward tilting state while maintaining the constant acceleration of the vehicle when the relative vehicle speed calculated in the calculating is a negative value and the inter-vehicle distance detected by the distance detector is smaller than a second predetermined inter-vehicle distance being smaller than the first predetermined inter-vehicle distance at a second time point after the first time point.

7. A collision mitigation apparatus configured to mitigate a shock to an occupant of a vehicle when a rearward vehicle collides into the vehicle from behind,
the apparatus comprising:
a driving unit configured to generate a driving force in a manner of being able to vary a distribution of the driving force to a front wheel and a rear wheel; and
an electronic control unit having a microprocessor and a memory, wherein
the microprocessor is configured to function as:
a collision prediction unit configured to predict whether the rearward vehicle collides into the vehicle; and
a drive force control unit configured to control the driving unit so that when it is predicted by the collision prediction unit that the rearward vehicle collides into the vehicle, the vehicle travels at a forward tilting state while accelerating immediately before the rearward vehicle collides into the vehicle, and
the drive force control unit is configured to vary the distribution of the driving force so that a driving force of the rear wheel is greater than a driving force of the front wheel while maintaining a constant acceleration of the vehicle.

8. The apparatus according to claim 7, wherein
the vehicle is a self-driving vehicle with a self-drive function,
the apparatus further comprises
a driving level switching portion configured to switch a driving automation level to a first driving automation level involving a driver responsibility to monitor surroundings during traveling or a second driving automation level not involving the driver responsibility to monitor the surroundings during traveling, and the drive force control unit controls the driving unit so that when the driving automation level is switched to the second driving automation level by the driving level switching portion and it is predicted by the collision prediction unit that the rearward vehicle collides into the vehicle, the vehicle travels at the forward tilting state while accelerating.

9. The apparatus according to claim 7, wherein
the driving unit includes a front driving unit driving the front wheel and a rear driving unit driving the rear wheel,
the front driving unit is configured by a motor-generator, and
the drive force control unit controls the driving unit so that when it is predicted by the collision prediction unit that the rearward vehicle collides into the vehicle, the front driving unit generates a regenerative torque and the rear driving unit generates a driving torque while accelerating the vehicle at the constant acceleration.

10. The apparatus according to claim 9, wherein
the front driving unit is a first motor-generator, and
the rear driving unit is configured by a second motor-generator.

11. The apparatus according to claim 7, further comprising
a distance detector configured to detect an inter-vehicle distance from the vehicle to the rearward vehicle, wherein
the microprocessor is configured to further function as
a relative speed calculation unit configured to calculate a relative vehicle speed by subtracting the vehicle speed of the rearward vehicle from the vehicle speed of the vehicle, and
the collision prediction unit predicts that the rearward vehicle collides into the vehicle when the inter-vehicle distance detected by the distance detector is smaller than a predetermined inter-vehicle distance and the relative vehicle speed calculated by the relative speed calculation unit is smaller than a predetermined relative vehicle speed.

12. The apparatus according to claim 11, wherein
the predetermined inter-vehicle distance is a first predetermined inter-vehicle distance,
the predetermined relative vehicle speed is a negative value, and
the drive force control unit controls the driving unit so that the driving force of the vehicle increases when it is predicted by the collision prediction unit that the rearward vehicle collides into the vehicle at a first time point, and so that the vehicle travels at the forward tilting state while maintaining the constant acceleration of the vehicle when the relative vehicle speed calculated by the relative speed calculation unit is a negative value and the inter-vehicle distance detected by the distance detector is smaller than a second predetermined inter-vehicle distance being smaller than the first predetermined inter-vehicle distance at a second time point after the first time point.

13. A collision mitigation method configured to mitigate a shock to an occupant of a vehicle when a rearward vehicle collides into the vehicle from behind, the vehicle including a driving unit configured to generate a driving force in a manner of being able to vary a distribution of the driving force to a front wheel and a rear wheel, the method comprising:
predicting whether the rearward vehicle collides into the vehicle; and
controlling the driving unit so that when it is predicted that the rearward vehicle collides into the vehicle, the vehicle travels at a forward tilting state while accelerating immediately before the rearward vehicle collides into the vehicle, wherein
the controlling includes varying the distribution of the driving force so that a driving force of the rear wheel is greater than a driving force of the front wheel while maintaining a constant acceleration of the vehicle.

14. The method according to claim 13, wherein
the vehicle is a self-driving vehicle with a self-drive function,
the method further comprises
switching a driving automation level to a first driving automation level involving a driver responsibility to monitor surroundings during traveling or a second driving automation level not involving the driver responsibility to monitor the surroundings during traveling, and
the controlling includes controlling the driving unit so that when the driving automation level is switched to the second driving automation level and it is predicted that the rearward vehicle collides into the vehicle, the vehicle travels at the forward tilting state while accelerating.

15. The method according to claim 13, wherein
the driving unit includes a front driving unit driving the front wheel and a rear driving unit driving the rear wheel,
the front driving unit is configured by a motor-generator, and
the controlling includes controlling the driving unit so that when it is predicted that the rearward vehicle collides into the vehicle, the front driving unit generates a regenerative torque and the rear driving unit generates a driving torque while accelerating the vehicle at the constant acceleration.

16. The method according to claim 15, wherein
the front driving unit is a first motor-generator, and
the rear driving unit is configured by a second motor-generator.

17. The method according to claim 13, further comprising:
detecting an inter-vehicle distance from the vehicle to the rearward vehicle; and
calculating a relative vehicle speed by subtracting the vehicle speed of the rearward vehicle from the vehicle speed of the vehicle, wherein
the predicting includes predicting that the rearward vehicle collides into the vehicle when the inter-vehicle distance detected in the detecting is smaller than a predetermined inter-vehicle distance and the relative vehicle speed calculated in the calculating is smaller than a predetermined relative vehicle speed.

18. The method according to claim 17, wherein
the predetermined inter-vehicle distance is a first predetermined inter-vehicle distance,
the predetermined relative vehicle speed is a negative value, and
the controlling includes controlling the driving unit so that the driving force of the vehicle increases when it is predicted that the rearward vehicle collides into the vehicle at a first time point, and so that the vehicle travels at the forward tilting state while maintaining the constant acceleration of the vehicle when the relative vehicle speed calculated in the calculating is a negative value and the inter-vehicle distance detected in the detecting is smaller than a second predetermined inter-vehicle distance being smaller than the first predetermined inter-vehicle distance at a second time point after the first time point.

* * * * *